United States Patent [19]
Lichtenfels, II et al.

[11] Patent Number: 5,315,563
[45] Date of Patent: May 24, 1994

[54] EXTERNAL SEALED INTRUSIVE MOUNTING ARRANGEMENT FOR A FUEL LEVEL SENSOR

[75] Inventors: Frederick L. Lichtenfels, II, Vergennes; Robert E. Birkett, Shelburne; Ward J. Nial, So. Burlington; Frederick G. Hoff, Bristol, all of Vt.

[73] Assignee: Simmonds Precision Products, Inc., Akron, Ohio

[21] Appl. No.: 977,360

[22] Filed: Nov. 17, 1992

[51] Int. Cl.⁵ ............................................. G01S 15/08
[52] U.S. Cl. .................................... 367/99; 367/908; 367/165
[58] Field of Search ........................ 367/99, 908, 165; 342/118; 340/621; 73/290 V

[56] References Cited

U.S. PATENT DOCUMENTS

| | | | |
|---|---|---|---|
| 4,130,018 | 12/1978 | Adams et al. | 73/290 V |
| 4,365,515 | 12/1982 | Abts | 73/632 |
| 4,570,483 | 2/1986 | Sobue | 73/290 V |
| 4,625,570 | 12/1986 | Witherspoon et al. | 73/863.81 |
| 4,806,902 | 2/1989 | Gana | 340/623 |
| 4,850,213 | 7/1989 | Steinebrunner et al. | 73/290 V |
| 4,901,776 | 2/1990 | Attinello | 141/95 |
| 4,958,527 | 9/1990 | Couvillion | 73/863.86 |
| 4,984,449 | 1/1991 | Caldwell et al. | 73/49.2 |
| 5,172,594 | 12/1992 | Dyke | 73/290 V |

*Primary Examiner*—Daniel T. Pihulic
*Attorney, Agent, or Firm*—William E. Zitelli; Leonard L. Lewis

[57] ABSTRACT

An intrusive fluid sensor mounting arrangement for a fluid container includes first and second tubes, the first tube being attachable to a wall of the container such that a first end of the first tube is open to the container exterior through the container wall and a second end of the first tube extends into the container; the second tube being sized to slide axially within the first tube between first and second positions; the second tube having a first end accessible from outside the container such that a sensor can be installed in and removed from the second tube; the second tube providing fluid communication between the sensor and fluid in the container when the second tube is in the first position, and substantially preventing fluid loss from the container when the second tube is in the second position.

25 Claims, 3 Drawing Sheets

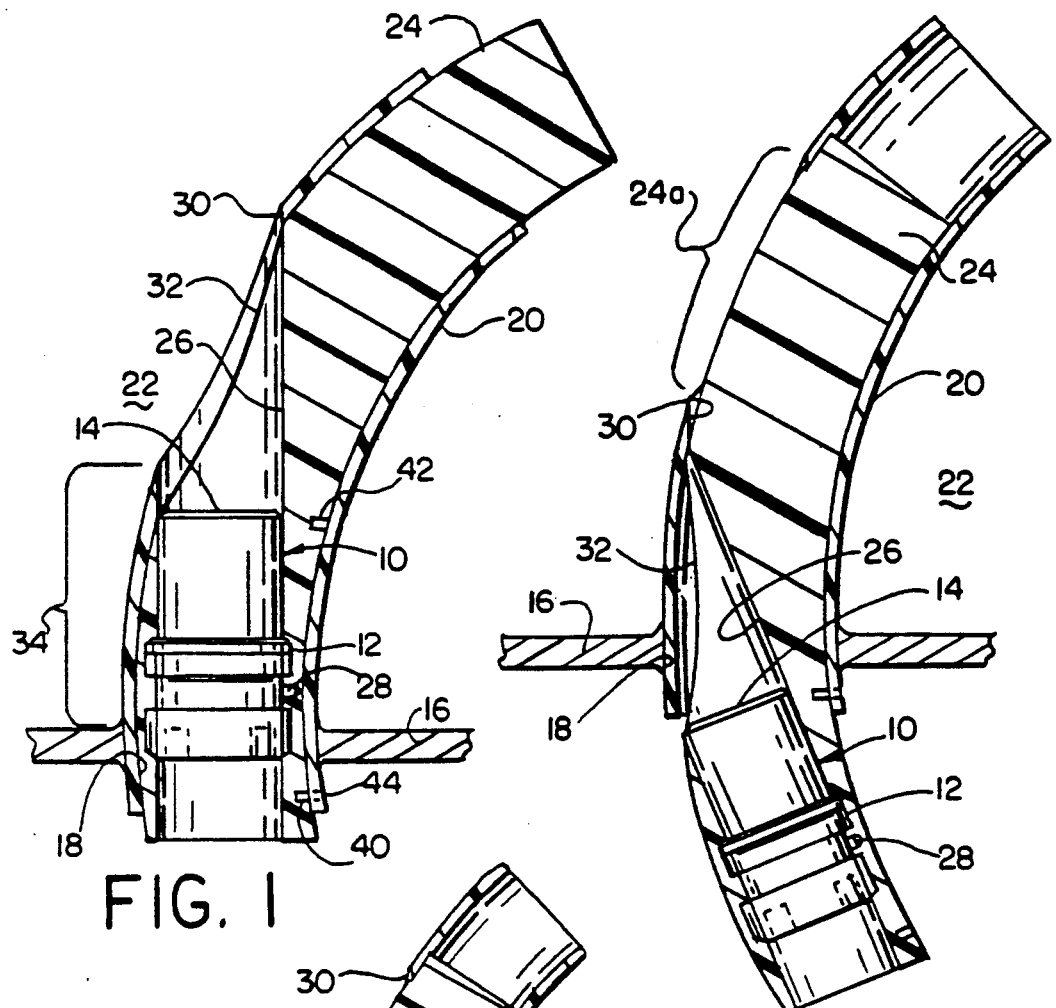
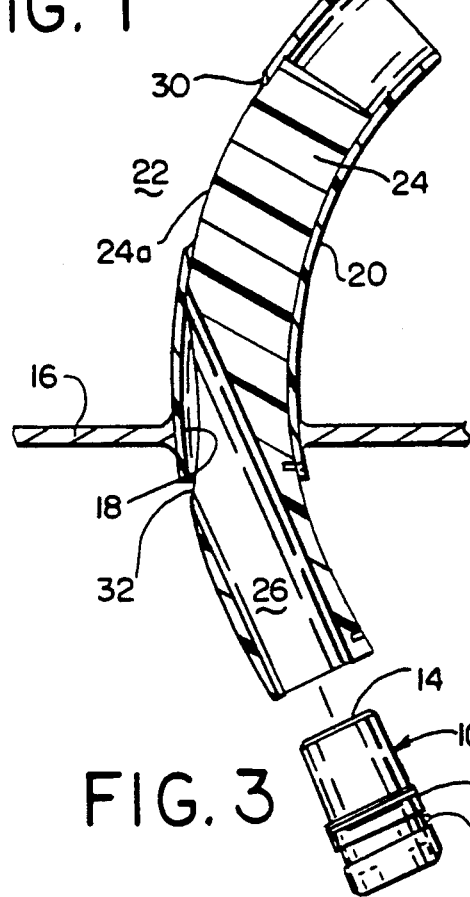
FIG. 1
FIG. 2
FIG. 3

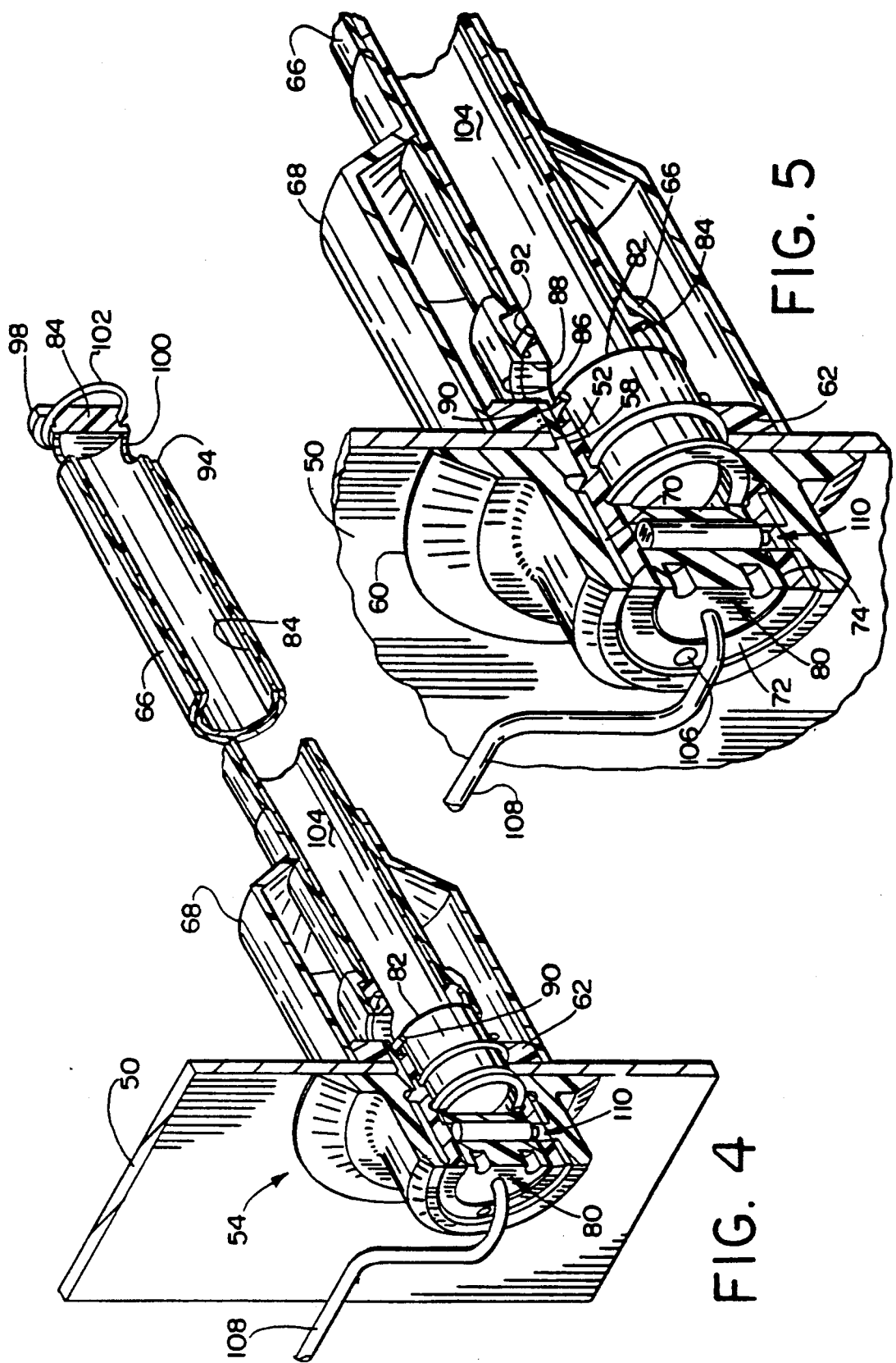

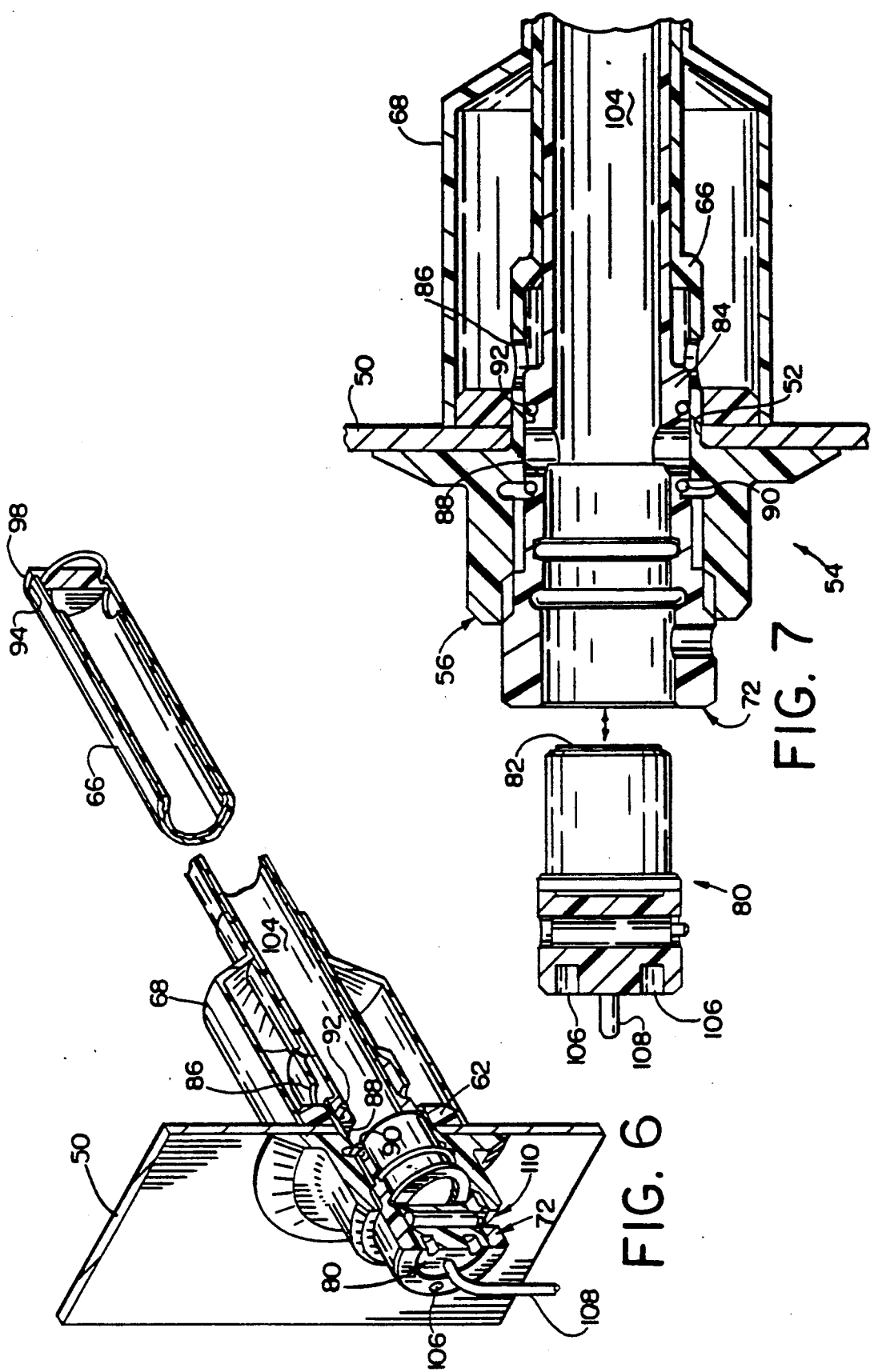

5,315,563

EXTERNAL SEALED INTRUSIVE MOUNTING ARRANGEMENT FOR A FUEL LEVEL SENSOR

BACKGROUND OF THE INVENTION

The invention relates generally to fluid level sensors, such as acoustic transducers that emit and receive acoustic pulses. More particularly, the invention relates to techniques for mounting ultrasonic fluid level sensors in a container in an intrusive arrangement so that the fluid in the container wets the transducer active surface.

The use of acoustic transducers for determining fluid levels in containers is well known. In one form of use known as intrusive, an acoustic transducer is mounted within the container so that the transducer emits the acoustic pulses directly into the fluid. Typically, a still-well is used to reduce the effects of bubbles in the fluid, or fluid swashing around the transducer, as well as to provide a channel for the acoustic waves to follow to the surface of the fluid.

A typical application of an intrusive transducer is with fuel tanks used on aircraft. By mounting a transducer at the bottom of a tank, the transducer can be used to emit pulses towards the fuel surface. The round trip time for the acoustic energy to be reflected back to the transducer can be correlated with the fuel height when the velocity of the acoustic pulses in the fuel is known.

Numerous problems are encountered with the known fuel sensor mounting arrangements. Among them is the fact that sensors typically are mounted to the tank in such a manner that in order to remove a sensor (such as for repair or replacement during routine maintenance) the fuel must first be removed from the tank. Draining the fuel for simple replacement of a sensor is an expensive and time consuming task. In other mounting arrangements, the sensors are fixed to the tank wall, thus not only requiring draining the fuel but also an extensive tear down of the fuel tank.

The latest generation aircraft are expected to make extensive use of composite materials for the wings. In circumstances where the wing also serves as the fuel tank, tear down for sensor replacement will not be acceptable maintenance practice.

The need exists, therefore, for an intrusive sensor mounting arrangement that permits quick and easy sensor installation and removal without needing to drain the fuel prior to sensor removal. The mounting arrangement should also provide minimal fuel displacement from the fuel tank when a sensor is removed; and the sensor should be installable and removable without tank or structural tear down or damage.

SUMMARY OF THE INVENTION

In response to the above identified problems of the known systems, the present invention contemplates an intrusive fluid sensor mounting arrangement for a fluid container, wherein the mounting arrangement comprises first and second tubes, the first tube being attachable to a wall of the container such that a first end of the first tube is open to the container exterior through the container wall and a second end of the first tube extends into the container; the second tube being sized to slide axially within the first tube between first and second positions; the second tube having a first end accessible from outside the container such that a sensor can be installed in and removed from the second tube; the second tube providing fluid communication between the sensor and fluid in the container when the second tube is in the first position, and substantially preventing fluid loss from the container when the second tube is in the second position.

These and other aspects and advantages of the present invention will be readily understood and appreciated by those skilled in the art from the following detailed description of the preferred embodiments as the best mode contemplated for carrying out the invention, in view of the accompanying drawings.

BRIEF DESCRIPTION OF THE DRAWINGS

FIG. 1 is a simplified perspective in partial section of an intrusive fluid sensor mounting arrangement according to the present invention with a sensor installed and exposed to fluid in a container;

FIG. 2 illustrates the mounting arrangement of FIG. 1 with the seal tube backed partially out of the outer tube;

FIG. 3 illustrates the mounting arrangement of FIG. 1 with the seal tube backed partially out of the outer tube and the sensor removed;

FIG. 4 is a perspective view in partial section of another mounting arrangement according to the invention;

FIG. 5 is an enlarged view of the flange assembly illustrated in FIG. 4;

FIG. 6 illustrates the mounting arrangement of FIG. 4 with the inner stillwell partially retracted to a position in which fluid flow is blocked; and FIG. 7 is an enlarged view of the flange assembly in the configuration of FIG. 6, with the sensor removed.

DESCRIPTION OF PREFERRED EMBODIMENTS

The present invention contemplates in a general sense a mounting technique for positioning an electronic device inside a fluid container such that the device can be installed and removed without significant loss of fluid from the container. The invention is particularly useful for intrusive installation of a device within a container such that the device is directly exposed to the fluid therein. As an example, the invention has been found to be particularly useful for intrusive installation of an ultrasonic fuel level sensor inside an aircraft fuel tank. Although the preferred embodiments of the invention are described herein with reference to such a specific application, it will be readily appreciated that the invention can similarly be used in different situations that impose intrusive mounting requirements for an electronic device.

With reference now to FIG. 1, a first embodiment of the invention is illustrated in partial cross-section. An ultrasonic transducer unit is generally indicated with the numeral 10. Such a transducer typically includes an enclosure 12 that with an encapsulant holds an electronics package as well as an active acoustic element 14 such as, for example, a piezoelectric crystal. The particular design of the transducer 10 forms no part of the instant invention, although the invention is especially useful with transducers that are used in direct contact with fluid in a container.

In FIG. 1, a fuel tank bottom wall 16 includes a through hole 18. An outer tube 20 is attached to the tank wall 16 and extends into the tank interior 22. The outer tube 20 is preferably fixed to the tank so that it will not move axially. The outer tube 20 may be made of, for example, aluminum or plastic in the case where the tank wall is metal, and attached by gaskets and bolts or welded. In cases where the tank wall 16 is a composite material such as, for example, graphite epoxy or other carbon composite materials, the outer tube can be made of, for example, a polymeric material such as filled nylon and attached by adhesive bonding.

An inner seal tube 24 is inserted axially into the outer tube 20 and is appropriately sized to have a close slip-type fit along the inner surface of the outer tube 20. The seal tube 24 is preferably a hollow piece of plastic-type material with a non-axial channel 26 formed therein. The actual materials selected for the outer tube and seal tube, of course, are largely a matter of design choice depending on the particular operating environment of the sensor. The channel 26 is sized to receive and retain the sensor assembly 10. The sensor 10 can be provided with a retaining pin 28 that engages a slot or hole (not shown) in the seal tube 24 to help hold the sensor 10 in the tube when it is fully installed. The sensor 10 can easily be removed by pushing the pin 28 inward to release it from the retaining hole and then sliding the sensor 10 back out of the seal tube 24. The sensor 10 preferably also includes an O-ring or other fluid-tight seal means (not shown) for blocking fuel loss through the channel 26 when the seal tube 24 is in the fully inserted or engaged position.

The outer tube 20 is preferably arcuate in shape and includes a fuel access or fill hole 30. The seal tube channel 26 opens to the seal tube exterior also through an access hole 32. In the position illustrated in FIG. 1, when the sensor 10 is installed and the seal tube fully inserted into the outer tube 20, the seal tube access hole 32 registers or is aligned with the fuel access hole 30 of the outer tube. This fluid communication between the access holes permits fluid in the container, such as fuel, to enter the channel 26 and engage or wet the transducer 10 active surface. For example, for an ultrasonic transducer that is used to detect the fuel height, the sensor is positioned at the bottom of the tank and the ultrasonic pulses are emitted towards the surf ace. When the echo is received, an electronic circuit is used (not shown) to determine the round trip time for the echo to be received from when the pulse was emitted. This time period can be accurately correlated with the fuel height when the velocity of the acoustic waves in the fluid is known. Those skilled in the art will readily understand that the design of FIG. 1 includes an offset height 34 that can be selected as desired for the minimum height of the fluid detectable by the sensor 10.

In FIG. 2, we show the seal tube 24 in a second position in which it has been axially slid out of the outer tube 20 part way. This position can be used during both installing and removal of the sensor 10 from the seal tube 24. In the position of FIG. 2, the outer tube hole 30 and the seal tube hole 32 are not aligned, and in fact a portion 24a of the seal tube outer surface blocks or closes off the outer tube fuel access hole 30 from the channel 26. The close slip fit of the inner and outer tubes 20,24 prevents fuel in the tank from flowing out through the fuel access hole. An O-ring or other convenient seal means (not shown) can be provided between the seal tube and the outer tube to further aid in preventing fuel from escaping between the two tubes. As illustrated in FIG. 3 then, the sensor 10 can be removed (or installed) without significant loss of fluid except perhaps for fluid trapped within channel 26 which will be small indeed compared to the total fuel quantity. The sensor 10 can thus be intrusively installed and/or removed quickly and easily without loss of fuel, without needing to drain the tank first, and without needing any special tear down or other tank disassembly. It will also be noted that in the position illustrated in FIG. 1, the channel 26 can be used to provide a directional function for the acoustic pulses emitted from and received by the sensor 10. Furthermore, the arcuate shape of the tubes 20,24 permits, for example, the sensor to be mounted in a bottom tank wall yet emit acoustic pulses towards the fuel surface. Alternatively, the curved tubes could permit a sensor to be mounted on a side tank wall with acoustic pulses directed towards the surface. In this example, the sensor could be installed sideways in the tube 24 at an optimum angle.

Referring again to FIG. 1, the seal tube 24 preferably includes first and second locking pins 40,42. These pins are axially spaced along the outer perimeter of the seal tube and provide a means for positive engagement of the seal tube in the open and closed position. For example, in FIG. 1, the lower pin 40 engages a hole or recess 44 in the outer tube 20 when the seal tube is fully inserted. This locking action is a positive indication that the tube is inserted and also can prevent the tube from being accidentally backed out. The recess is accessible from outside the tank wall 16 so that the pin 40 can be released to allow the seal tube 24 to be slid back as in FIG. 2. When the seal tube 24 has been retracted to the position of FIG. 2, the upper pin 42 engages the same external recess 44 in the outer tube. This engagement can be used as a positive indication that the fill hole 30 is blocked and also to prevent accidentally backing the seal tube 24 all the way out. The seal tube can then be returned to the position of FIG. 2 by releasing the pin 42 from the recess 44.

FIGS. 4–7 illustrate another embodiment of the invention. In this embodiment, a bottom tank wall 50 is provided with a through hole 52. A flange assembly 54 is fixedly attached to the wall 50 and a portion of the flange assembly extends into the tank interior. As more clearly illustrated in FIG. 5, the flange assembly 54 includes a preferably integral body 56 that defines a central chamber 58. An enlarged mounting flange 60 extends radially outward from the cylinder 58 and is fixedly attached to the tank wall 50 by any convenient means such as bolts or adhesive bonding (not shown) to name just two of many examples. A backup flange 62 is provided on the interior of the flange assembly to provided added support for the flange assembly 54. The flanges 54,60 may be sealed to prevent fluid loss at the interface of the flange and wall.

An inner extension 64 of the flange assembly 54 and/or the backup flange, for example, is integral with or otherwise attached to a first end of an outer stillwell 66. As best shown in FIG. 4, the outer stillwell is a generally hollow tube that extends axially into the tank interior (upward for our example wherein the wall 50 is a bottom fuel tank wall). A baffle 68 may be provided around the entire bottom structure to reduce the effects of bubbles in the fuel, and sudden movements and changes in attitude of the tank.

Referring again primarily to FIG. 5, the flange chamber 58 is threaded as at 70 so that a threaded collar 72 can be mated therewith. The collar defines a central bore 74 that is also threaded so that a threaded ultrasonic sensor 80 can be mated therewith and easily unmated by unscrewing the sensor from the collar. The sensor 80 includes an active acoustic surf ace 82 that is positioned approximately at the distal end of the inner flange extension 64 when the collar 72 is fully seated in the flange assembly 54 and the sensor 80 is fully seated in the collar 72. The collar 72 extends into the tank interior and is integral with or otherwise attached to an inner stillwell 84. The inner stillwell 84 extends coaxially with the outer stillwell 66 up into the tank interior. However, as shown in FIG. 5, the inner stillwell is slightly axially longer than the outer stillwell, for purposes that are explained hereinafter. The inner and outer stillwells are preferably closely fit but there need not be an interference fit. The inner stillwell should be able to easily slide axially within the outer stillwell.

The outer stillwell 66 is provided with a fill hole 86 and the inner stillwell 84 is provided with a fill hole 88. These fill holes 86,88 are preferably at the lower proximate end of the stillwells adjacent the active surface of the sensor 80 when the assembly is fully mated up. This close proximity of the fill holes with the active surface assures quick and efficient wetting of the sensor 80.

In addition to their axial location, the fill holes are positioned such that when the collar 72 is fully seated in the flange body 56, the fill holes 86,88 register with each other to maximize fuel flow therethrough, as illustrated in FIG. 5, into a fluid passageway defined by the interior of the inner stillwell 84.

A first O-ring type resilient seal 90 provides a fluid-tight seal between the collar 72 and the flange body 56 when the collar 72 is in the mated or open position illustrated in FIG. 4. This seal 90 is axially positioned below the fill hole 88. A second O-ring type resilient seal 92 is provided axially above the fill holes 86,88 between the inner and outer stillwells 66,84, and provides a fluid-tight seal when the collar is positioned in a second position after being backed out part way from the flange body 56, as will be explained in greater detail shortly.

The distal or upward end 94 of the outer stillwell 66 (FIG. 4) is open to the fuel tank interior. The distal end 96 of the inner stillwell 84 includes a closed flanged end 98 that serves as a limit stop. The flange 98 is sized so that it engages the distal end of the outer stillwell 66 thus preventing the inner stillwell from being removed from the outer stillwell. The inner stillwell 84 is also provided with vent holes 100 which permit the escape of gas as the inner stillwell fills with fluid through the fill holes 86,88. An O-ring type seal 102 is provided between the vent holes 100 and the flange stop 98 to provide a fluid-tight seal when the inner stillwell 84 is axially shifted towards the wall 50. Thus the O-ring 102 prevents fluid from entering the inner stillwell fluid passageway when the inner stillwell is positioned for removal of the sensor 80.

With reference now to FIG. 6, the mounting arrangement of FIG. 4 is shown with the inner stillwell partially retracted to a position in which fuel flow out of the container is substantially blocked. As illustrated, the threaded collar 72 is backed out of the flange body 56 until the limit flange 98 on the distal end of the inner stillwell 84 engages the distal end 94 of the outer stillwell 66. In this position the vent ports 100 are covered by the outer stillwell and sealed by the O-ring seal 102.

As best illustrated in FIG. 7, when the collar 72 is backed out of the flange body 54 to the seal position as shown, the fill holes 86,88 are axially displaced from each other and no longer provide a fluid path for fuel from the container to the fluid passageway 104 within the inner stillwell 84. Furthermore, the second O-ring 92 is now in position between the flange body 56 and the collar 72 below the outer stillwell fill hole 86, which prevents fuel from seeping out of the container. Also in FIG. 7 we show the sensor assembly 80 completely removed from the flange assembly 54. So long as the sensor 80 is removed when the collar 72 is in the seal or closed position, fuel loss from the tank is minimal and limited to whatever small amount of fuel gets trapped in the inner stillwell. Since the typical dimensions of the inner stillwell are 0.75 in. inner diameter by 6 in. in length, the amount of fuel loss will be negligible.

The collar 72 and the sensor 80 may be provided with detents 106 that receive lugs of a tool, such as a spanner wrench, for convenient coupling and uncoupling of those parts from their respective threaded connections. The sensor 80 is also conveniently provided with a pigtail type cable 108 for supplying power to the sensor and receiving output data therefrom for routing to a signal processor (not shown). The sensor 80 can further be provided with a retractable locking pin 110 that snaps into a recess in the collar 72 when the sensor is fully mated with the collar. The pin 110 thus prevents the sensor from backing out during use, as well as preventing the sensor from backing out while the collar is being partially unscrewed from the flange assembly 54. The locking pin 110 can be positioned axially such that it can only be accessed when the collar 72 is in the closed position, thus preventing accidental removal of the sensor before the tank container is sealed shut.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

What is claimed is:

1. An intrusive fluid level sensor mounting arrangement for a fluid container, said mounting arrangement comprising first and second tubes, said first tube being attachable to a wall of the container such that a first end of said first tube is open to the container exterior through the container wall and a second end of said first tube extends into the container; said second tube being sized to slide axially within said first tube between first and second positions; said second tube having a first end accessible from outside the container such that a sensor can be installed in and removed from said second tube; said second tube providing fluid communication between the sensor and fluid in the container when said second tube is in said first position, and substantially preventing fluid loss from the container when said second tube is in said second position.

2. The mounting arrangement of claim 1 wherein said first and second tubes each comprise a fluid opening, said fluid openings being generally aligned and permitting fluid communication between the sensor and fluid in the container when said second tube is in said first position, and a portion of said second tube wall blocking said first tube fluid opening when said second tube is in said second position.

3. The mounting arrangement of claim 1 wherein said first tube comprises a stillwell attached to a flange unit, said flange unit being attachable to the container wall and extending there through to provide a rigid support for said stillwell.

4. The mounting arrangement of claim 3 wherein said second tube comprises a second stillwell, said second stillwell having means for slidably mounting one end of said second stillwell in said flange so that said second stillwell can be accessed from outside the container and slid to said second position to prevent loss of fluid from the container.

5. The mounting arrangement of claim 4 wherein said one end of said second stillwell includes means for releasably retaining the sensor, said second stillwell having an end opposite said one end, said second stillwell opposite end comprising means preventing sliding movement of said second stillwell beyond said second position.

6. The mounting arrangement of claim 5 wherein said second stillwell opposite end includes vent ports that are open to the container interior when said second stillwell is in said first position and are blocked by said first stillwell when said second stillwell is in said second position.

7. The mounting arrangement of claim 6 wherein said preventing means comprising an enlarged flange on said second stillwell opposite end, said enlarged flange being at least the diameter of said first stillwell to prevent said second stillwell from being pulled out of the container.

8. The mounting arrangement of claim 7 further comprising a resilient seal that provides a fluid tight seal between said first and second stillwells to seal said vent ports when said second stillwell is in said second position.

9. The mounting arrangement of claim 8 further comprising a second resilient seal that provides a fluid tight seal between a fill hole in said first stillwell and a fill hole in said second stillwell when said second stillwell is in said second position, said fill holes being generally aligned when said second stillwell is in said first position to permit fluid to flow from the container interior into said second stillwell and engage the sensor.

10. The mounting arrangement of claim 5 wherein said retaining means comprises a hole that extends through said flange and said second stillwell one end and a pin on the sensor that registers with the hole when the sensor is installed in said second stillwell, said hole providing access to said pin so that said pin can be displaced from said hole when the sensor is to be removed.

11. The mounting arrangement of claim 2 wherein said first tube is arcuate so that when said second tube is in said first position said second tube fluid opening is generally axially transverse the container wall.

12. The mounting arrangement of claim 11 wherein the container wall is the bottom wall of an aircraft fuel tank or wing.

13. The mounting arrangement of claim 6 wherein the container wall is a bottom wall of a fuel tank, said first and second stillwells being mounted generally axially transverse the container wall so as to extend upward into the fuel tank interior with the sensor being positioned at the tank bottom and emitting ultrasonic pulses up towards the fuel surface generally along said second stillwell interior.

14. An intrusive assembly for installing and removing a fuel sensor on a fuel tank, said assembly comprising a first tube fixed to a tank wall such that a first end of said first tube is open to the tank exterior through a tank wall and a second end of said first tube extends into the tank interior, said first tube having a fill hole through a wall thereof, said fill hole being axially spaced from said first tube ends and inside the tank; a second tube slidably received in said first tube and moveable between a first position and a second position; said second tube having a fluid passageway in fluid communication with a fuel level sensor when the sensor is installed in one end of said second tube accessible from outside the tank; said second tube blocking said fill hole when said second tube is in said first position to facilitate installing and removing the sensor; said second tube fluid passageway being in fluid communication with said fill hole when said second tube is in said second position to permit fuel to wet the sensor.

15. The mounting assembly of claim 14 wherein said fluid passageway directs ultrasonic pulses from the sensor into the fuel tank towards the fuel surface.

16. The mounting assembly of claim 15 wherein said second tube comprises means for preventing complete removal of said second tube from said first tube during routine removal and installation of a sensor.

17. The mounting assembly of claim 16 comprising means for locking said second tube in said-second position.

18. The mounting assembly according to claim 17 wherein said first tube is arcuate so that said fluid passageway lies on an axis that is generally transverse the tank wall when said second tube is in said second position.

19. The mounting assembly according to claim 14 wherein said first tube is an outer stillwell supported on a mounting flange and said second tube is an inner stillwell, said mounting flange having a first portion attached to the fuel tank wall exterior and a second portion extending into said tank through a tank wall orifice.

20. The mounting assembly of claim 19 wherein said mounting flange has a central passageway therethrough, said inner stillwell being slidably received in said central passageway.

21. The mounting assembly of claim 20 wherein said inner stillwell has a fill port near the sensor end thereof, said outer stillwell fill hole registers with said inner stillwell port when said inner stillwell is in said second position, said inner stillwell fill port being axially displaced from said outer stillwell fill hole when said inner stillwell is in said first position, said inner stillwell blocking fuel flow through said outer stillwell fill hole into said inner stillwell when said inner stillwell is in said first position.

22. The mounting assembly of claim 20 wherein said inner stillwell is attached to a retractable collar that is mateable with said mounting flange.

23. The mounting assembly of claim 22 wherein said collar is threadably engaged to said mounting flange and the sensor is threadably engaged to said collar.

24. The mounting assembly of claim 22 wherein the sensor includes a locking means accessible when said collar is retracted so that said inner stillwell is in said first position in order for the sensor to be installed or removed.

25. An intrusive mounting arrangement for mounting a fluid sensor in a fluid container such that the sensor is exposed to fluid in the container, said mounting arrangement comprising means for mounting the sensor to the container through a hole in the container wall, and means for slidably positioning the sensor in first and second positions so that the sensor is exposed to fluid in the container when the sensor is in said first position, and the fluid is substantially blocked from said hole by said slidable positioning means during sensor removal when the sensor is in said second position.

* * * * *